(12) United States Patent
Kao et al.

(10) Patent No.: US 8,599,321 B2
(45) Date of Patent: Dec. 3, 2013

(54) TOUCH-SENSING DISPLAY DEVICE AND TOUCH-SENSING MODULE THEREOF

(75) Inventors: Kuo-Feng Kao, Hsin-Chu (TW);
Tsung-Chin Cheng, Hsin-Chu (TW);
Kung-Chieh Huang, Hsin-Chu (TW);
Zeng-De Chen, Hsin-Chu (TW);
Seok-Lyul Lee, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 393 days.

(21) Appl. No.: 12/981,762

(22) Filed: Dec. 30, 2010

(65) Prior Publication Data

US 2011/0157061 A1 Jun. 30, 2011

(30) Foreign Application Priority Data

Dec. 31, 2009 (TW) .............................. 98146565 A (51) Int. Cl.
*G02F 1/1335* (2006.01)
(52) U.S. Cl.
USPC .............. 349/12; 345/173; 345/174; 345/176
(58) Field of Classification Search
None
See application file for complete search history.

(56) References Cited

U.S. PATENT DOCUMENTS

| | | | |
|---|---|---|---|
| 7,034,808 B2 * | 4/2006 | Sakata et al. | 345/173 |
| 2010/0026658 A1 * | 2/2010 | Chien et al. | 345/174 |
| 2010/0277418 A1 | 11/2010 | Huang et al. | |

FOREIGN PATENT DOCUMENTS

| | | |
|---|---|---|
| CN | 1441295 A | 9/2003 |
| CN | 1720499 | 1/2006 |
| CN | 101030115 | 9/2007 |
| JP | 05-088162 | 4/1993 |
| JP | 2000-194067 | 7/2000 |
| JP | 2001-036900 | 2/2001 |
| JP | 2001-264750 | 9/2001 |
| JP | 2006-079669 | 3/2006 |
| JP | 2006-085801 | 3/2006 |
| JP | 2009-069486 | 4/2009 |
| JP | 2009-098641 | 5/2009 |
| JP | 2009-098644 | 5/2009 |
| JP | 2009217216 | 9/2009 |

OTHER PUBLICATIONS

English translation of abstract of JP 2009217216.
English translation of abstract of CN 1441295 A.
English translation of abstract of CN 101030115.
English translation of abstract of CN 1720499.
China Office Action dated Aug. 1, 2012.

(Continued)

*Primary Examiner* — Thanh-Nhan P Nguyen
(74) *Attorney, Agent, or Firm* — McClure, Qualey & Rodack, LLP (57) ABSTRACT

A touch-sensing display device, specifically to a borderless touch-sensing display device, is disclosed. The touch-sensing display device includes a display module and a touch-sensing module. The touch-sensing module includes a first sensing sheet and a second sensing sheet, wherein a space exists between the first sensing sheet and the second sensing sheet. The first sensing sheet includes a lens layer, a plurality of first conductive portions, and a conductive film, wherein the conductive film is disposed on the lens layer while the first conductive portions are distributed on two opposite sides of the lens layer. The second sensing sheet includes a substrate, a plurality of second conductive portions, and a plurality of conductive strips, wherein the second conductive portions are selectively distributed on one of two sides of the substrate while the conductive strips are respectively connected to the second conductive portions and have different voltages.

23 Claims, 8 Drawing Sheets

(56) References Cited

OTHER PUBLICATIONS

English translation of abstract of JP 2001-264750.
English translation of abstract of JP 2006-085801.
English translation of abstract of JP 2001-036900.
English translation of abstract of JP 2009-098644.
English translation of abstract of JP 2009-098641.
English translation of abstract of JP 2009-069486.
English translation of abstract of JP 2006-079669.
English translation of abstract of JP 2000-194067.
English translation of abstract of JP 05-088162.

* cited by examiner

TOUCH-SENSING DISPLAY DEVICE AND TOUCH-SENSING MODULE THEREOF

BACKGROUND OF THE INVENTION

1. Field of the Invention

This invention relates to a touch-sensing display device and a touch-sensing module thereof, specifically to a borderless touch-sensing display device and a touch-sensing module.

2. Description of the Prior Art

Flat display devices are now the mainstream in display devices. Electronic products such as home television, monitors of personal computers and laptops, screens of mobile phones and digital cameras are now extensively using flat display devices. As more and more consumers have the demand for flat display device with ease of control, aesthetic appearance, and multi-functions, touch-sensing liquid crystal panels are now becoming a mainstream in flat display devices.

Due to the frame of the liquid crystal panel, images cannot be displayed at the location where the frame is disposed. In order to increase the display area of the liquid crystal panel and to achieve a borderless appearance of the liquid crystal panel, a lens layer with a Fresnel lens structure is conventionally disposed in the liquid crystal panel. In this way, the lens layer can magnify the images from the liquid crystal panel and conceals the frame of the liquid crystal panel to achieve a visual effect that a portion of the liquid crystal panel can have a borderless appearance.

Figure 1:
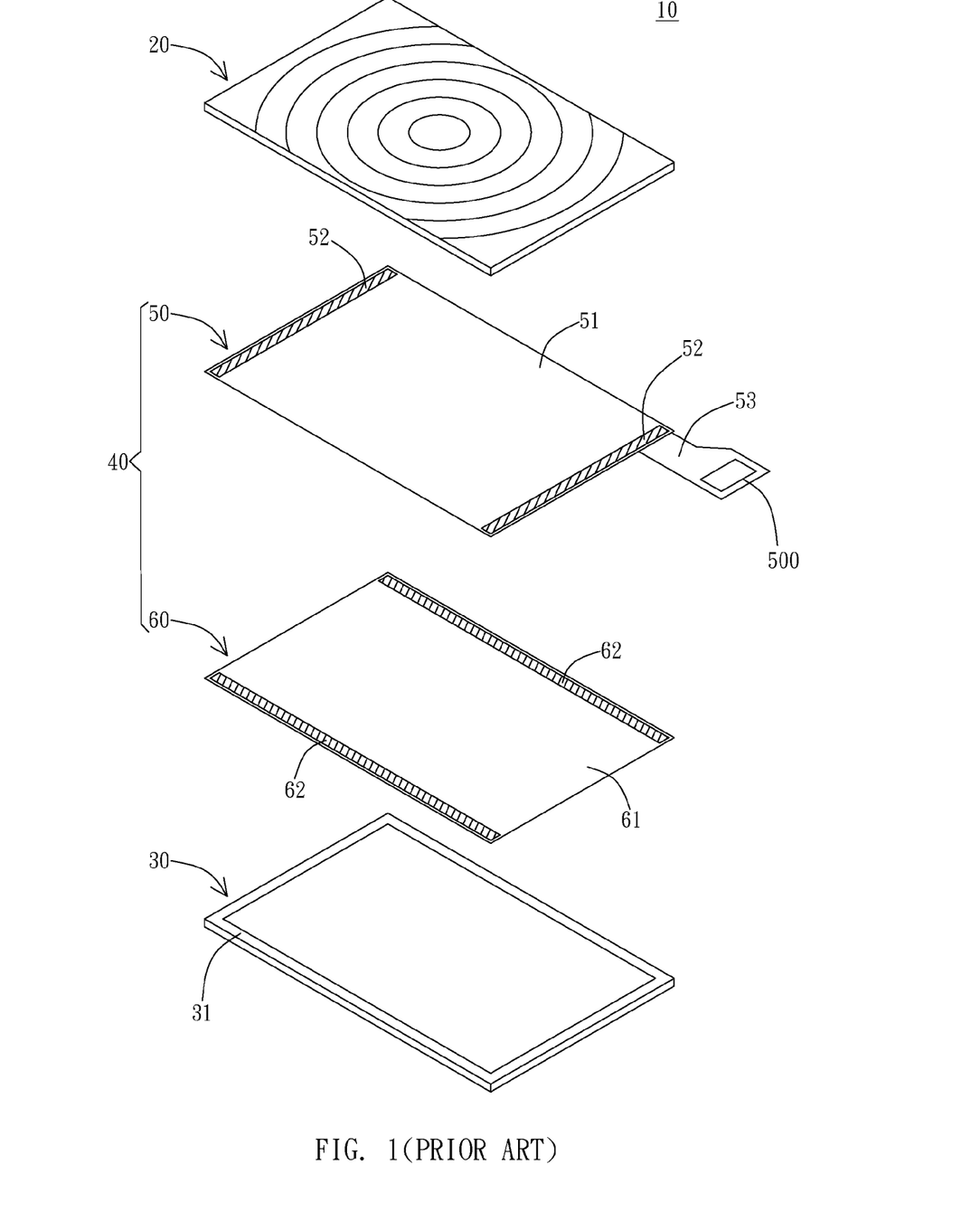
FIG. 1 is an exploded view of a conventional touch-sensing display device.

FIG. 1 is an exploded view of a conventional touch-sensing display device 10. The conventional touch-sensing display device 10 includes a lens layer 20, a display module 30 and a touch-sensing module 40, wherein the touch-sensing module 40 further includes an upper sensing sheet 50 and a lower sensing sheet 60. As FIG. 1 shows, the touch-sensing module 40 and the lens layer 20 are disposed on the display module 30 while the touch-sensing module 40 is disposed between the display module 30 and the lens layer 20. The lens layer 20 is a lens having a Fresnel lens structure. Due to the sealant 31 of the display module 30, images cannot be displayed at the location where the sealant 31 is disposed. In order to increase the display area of the display module 30 and to achieve a borderless appearance of the display module 30, the lens layer 20 is disposed on the display module 30 to magnify the images generated by the display module 30 and conceals a portion of the display module 30 not capable of displaying images, i.e., where the sealant 31 is disposed. In this way, the conventional touch-sensing device 10 can have a borderless appearance.

As FIG. 1 shows, an upper conductive film 51 and a lower conductive film 61 are disposed on the upper sensing sheet 50 and the lower sensing sheet 60, respectively. Two upper conductive lines 52 and two lower conductive lines 62 are disposed on two opposite sides of the upper sensing sheet 50 and the lower sensing sheet 60. Two ends of the upper sensing sheet 51 are electrically connected to the upper conductive lines 52, wherein a fixed voltage is applied across the upper conductive lines 52 to create a uniform electric field between the upper conductive lines 52. Similarly, a fixed voltage is applied across the lower conductive lines 62 to create a uniform electric field between the lower conductive lines 62. When a medium such as finger or pen touches the touch-sensing module 40, the conductive films 51, 61 of the touch-sensing module 40 will contact each other causing a voltage drop due to short circuit. The upper conductive line 52 detects the voltage of the lower conductive film 61 at the touch point via the upper conductive film 51 and then transmits the voltage to a backend processor 500. The backend processor 500 has a software-assisted function and can be disposed on a printed circuit board or a personal computer. Alternatively, the backend processor 500 can be connected to a flexible circuit board 53 as shown in FIG. 1 and then to other external devices for further processing. In different embodiment, the backend processor 500 can also be connected to the upper conductive line 52 in order to receive voltage signals directly; in this way, the flexible circuit board 53 can be omitted. Similarly, the lower conductive line 62 detects the voltage of the upper conductive film 51 at the touch point via the lower conductive film 61 and transmits the voltage to the backend processor 500. The backend processor 500 will then calculate the coordinate of the touch point after receiving the voltage signals from the conductive lines 52, 62.

As FIG. 1 shows, the lens layer 20 is disposed outside the touch-sensing module 40 as an add-on, and therefore the lens layer 20 will inevitably increase the overall thickness of the touch-sensing display device 10. Furthermore, the touch-sensing function and the relative sensitivity of the touch-sensing module 40 will be influenced by the lens layer 20. In addition, the upper conductive line 52 and the lower conductive line 62 are perpendicular to each other and are both disposed at the edge of the conductive films 51, 61. Therefore, the conductive lines 52, 62 will inevitably conceal part of the display area of the display module 30 increasing the difficulty in designing a borderless appearance. In other words, the sealant 31 and the display module 30 concealed by the conductive lines 52, 62 will decrease in the available display area. Currently, the market demands for thinner touch-sensing mobile device with a borderless appearance. Therefore, one of the current difficulties in display device manufacturing is to create a borderless display module with touch-sensing function and without increasing the overall thickness of the display device.

SUMMARY OF THE INVENTION

It is an object of the present invention to provide a thinner touch-sensing display device with greater available display area.

It is another object of the present invention to provide a touch-sensing display device with borderless appearance.

The touch-sensing display device of the present invention includes a display module and a touch-sensing module, wherein the touch-sensing module is disposed on the display module and a first space exists between the touch-sensing module and the display module. The touch-sensing module includes a first sensing sheet and a second sensing sheet, wherein the second sensing sheet is disposed between the first sensing sheet and the display module while a second space exists between the first sensing sheet and the second sensing sheet. The first sensing sheet includes a lens layer, a pair of first conductive portions and a conductive film, wherein the first conductive portions are disposed on the opposite two sides of the inner surface of lens layer. The lens layer has a Fresnel lens structure, wherein the conductive film is disposed on the inner surface of lens layer and connected to the first conductive portion with a fixed voltage applied between two first conductive portions. The second sensing sheet includes a substrate, a plurality of second conductive portions and a plurality of sensing conductive strips, wherein the second conductive portions are disposed on at least one side of the substrate.

The sensing conductive strips of the present invention are disposed on the substrate, wherein each sensing conductive strip corresponds to different voltages. In one embodiment of the prevent invention, the second sensing sheet further includes a plurality of resistance portions, wherein two ends of the resistance portions are connected to the second conductive portion and the sensing conductive strip, respectively. Each resistance portion has a substantial different resistance so that the corresponding sensing conductive strip has a voltage different form other sensing conductive strips. Two ends of the sensing conductive strip are connected to two different second conductive portions, but are not limited thereto; in different embodiments, the resistance portion can be disposed on the substrate in different configurations so that each sensing conductive strip has a different voltage. In this way, when the conductive film of the first sensing sheet is pressed to contact the sensing conductive strips at the touch point, the first conductive portion of the lens layer will transmit the voltage signal of the sensing conductive strip at the touch point to the conductive film and then to a backend processor for further processing. Similarly, the second conductive portion on the substrate will transmit the voltage signal of the conductive film at the touch point to the sensing conductive strip to the backend processor. The backend processor can calculate the coordinates of the touch point based on the received voltage signals. Furthermore, the lens layer is integrated into the touch-sensing module which allows the touch-sensing display device of the present invention to have a borderless appearance without increasing additional thickness.

DETAILED DESCRIPTION OF THE PREFERRED EMBODIMENT

The present invention provides a touch-sensing display device and a touch-sensing module thereof, specifically to a borderless touch-sensing display device and a touch-sensing module thereof. The present invention can be used in a mobile communication device for displaying images and providing touch-sensing capability, but is not limited thereto. In different embodiments, the present invention can be used in digital cameras or other electronic products in need of image-displaying and touch-sensing capabilities. The touch-sensing display device of the present invention includes a display module, wherein the display module includes a liquid crystal display module, but is not limited thereto; in different embodiments, the display module of the present invention includes organic light emitting diode or other flat display modules. Furthermore, the touch-sensing display device further includes a touch-sensing module disposed on the display module for detecting user's touch, wherein the touch-sensing module generates electrical signals based on the user's touch so that a backend processor can calculate the coordinates of the user's touch from the electrical signals.

Figure 2:
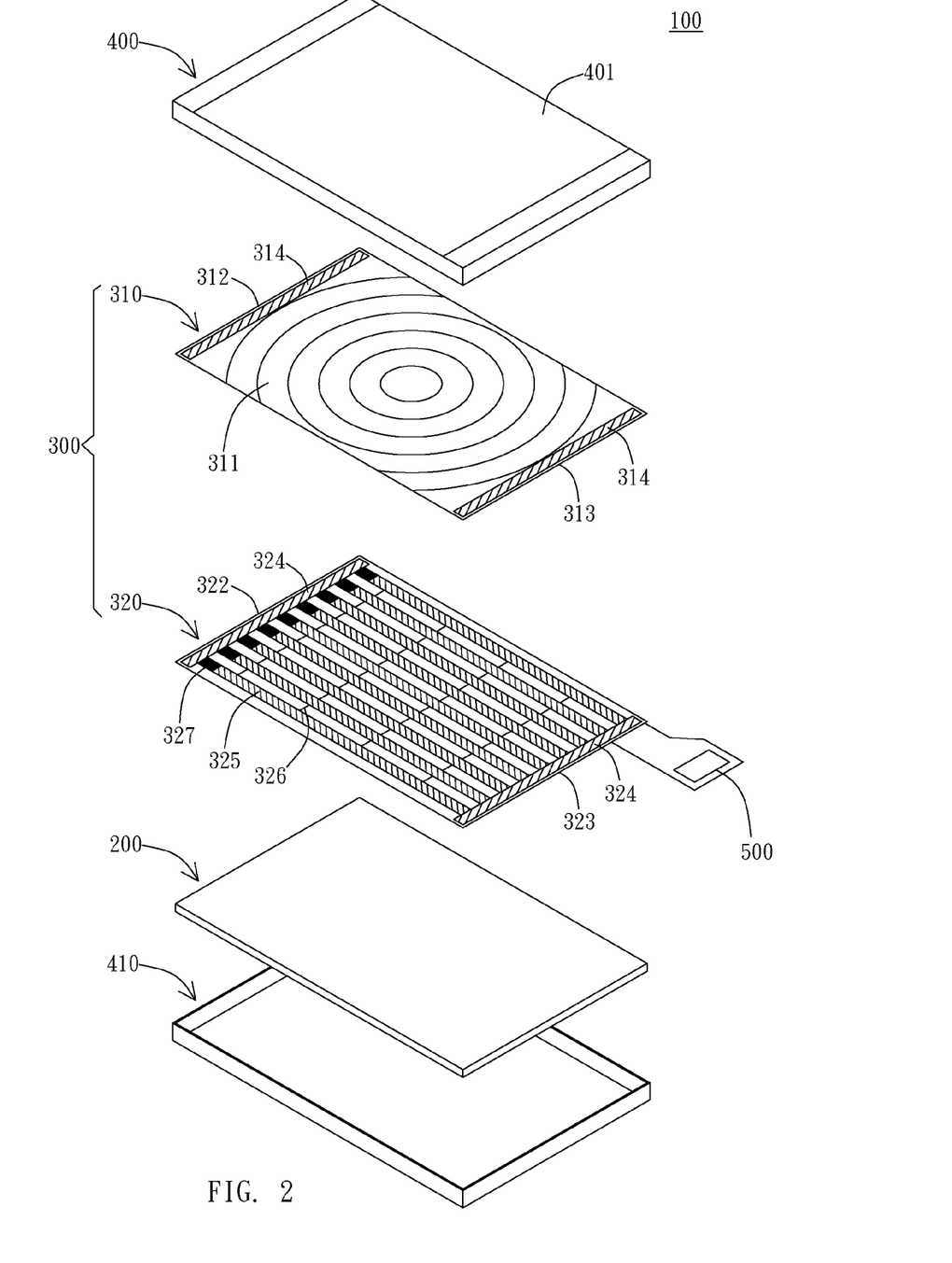
FIG. 2 is an exploded view of the touch-sensing display device of the present invention.

FIG. 2 is an exploded view of the touch-sensing display device 100 of the present invention. In the present embodiment, the touch-sensing display device 100 includes a display module 200, a touch-sensing module 300, an upper casing 400 and a lower casing 410, wherein the display module 200 and the touch-sensing module 300 are disposed between the upper casing 400 and the lower casing 410. The upper casing 400 further includes a display opening 401 for the display module 200 to display images outward through the display opening 401. In the embodiment illustrated in FIG. 2, the display module 200 is a liquid crystal display module, but is not limited thereto; in different embodiments, the display module 200 can be an organic light emitting display module or other flat display modules. The touch-sensing module 300 of the present embodiment is a resistive touch-sensing module, wherein the touch-sensing module 300 is disposed on the display module 200 to accept user's touch and generate electrical signals based on the user's touch so that a backend processor 500 can calculate the location of the user's touch from the electrical signals. The backend processor 500 having a software-assisted function can be disposed on a printed circuit board or within a personal computer. Alternatively, the backend processor 500 can be connected to a flexible circuit board as shown in FIG. 2, which is then connected to external devices such as personal computer for further processing (not shown). The above-mentioned flexible circuit board can be connected to the bottom of the touch-sensing module 300 to bypass the potential borderless region of the touch-sensing module 300. Furthermore, as FIG. 2 shows, when the touch-sensing module 300 is disposed between the upper casing 400 and the lower casing 410, only two sides 312, 313 of the touch-sensing module 300 are covered by the upper casing 400. In other words, the touch-sensing display device 100 of the present invention substantially has a borderless appearance on especially the two sides which are not covered.

In the embodiment illustrated in FIG. 2, the touch-sensing module 300 has a first sensing sheet 310 and a second sensing sheet 320, wherein the first sensing sheet 310 is located between the upper casing 400 and the second sensing sheet 320 while the second sensing sheet 320 is disposed between the first sensing sheet 310 and the display module 200. As FIG. 2 shows, the first sensing sheet 310 includes a lens layer 311, a pair of first conductive portions 314, and a conductive film, wherein the first conductive portions 314 are parallel with each other. The conductive film 315 (illustrated in FIG. 3B) is disposed on the inner surface of the lens layer 311 which faces the second sensing sheet 320. Two first conductive portions 314 are disposed on the lens layer 311 and adjacent to the first side 312 and the opposite second side 313 of the first touch-sensing sheet 310, respectively. The conductive film 315 is disposed on the surface of the lens layer 311 and between the first conductive portions 314 of the first touch-sensing sheet 310. The conductive film 315 is electrically connected to both of the first conductive portions 314. In the present embodiment, the material of the first conductive portion 314 includes conductive silver ink, but is not limited thereto; in different embodiments, the first conductive portion 314 can include conductive material such as molybdenum (Mo) or a combination of molybdenum and aluminum (Mo/Al/Mo). Furthermore, the conductive film 315 of the present embodiment is preferably a transparent conductive film including indium tin oxide (ITO), but is not limited thereto; in different embodiments, the conductive film 315 can include transparent conductive material such as indium zinc oxide (IZO) or aluminum-doped zinc oxide (AZO).

In the present embodiment, the second touch-sensing sheet 320 includes a substrate 321 (illustrated in FIG. 3B) and a pair of second conductive portions 324 disposed on the substrate 321 respectively near the third side 322 and the opposite fourth side 323 and faces the first touch-sensing sheet 310, wherein the second conductive portions 324 are parallel with each other. In the present embodiment, the substrate 321 includes ordinary glasses, polyethylene terephthalate (PET) films or tempered glasses, but is not limited thereto; in different embodiments, the substrate 321 can include a light-transmissible flat plate. Furthermore, the second conductive portion 324 can include conductive silver ink, but is not limited thereto; in different embodiments, the second conductive portion 324 can include conductive material such as molybdenum (Mo) or a combination of molybdenum and aluminum (Mo/Al/Mo). Furthermore, as FIG. 2 shows, the first side 312 and the second side 313 of the first touch-sensing sheet 310 correspond to the third side 322 and the fourth side 323 of the substrate 321, respectively. In other words, the first conductive portion 314 is disposed over the second conductive portion 324 and parallel to each other. The first conductive portion 314 and the second conductive portion 324 of the present embodiment are non-transparent conductive electrodes, and therefore the first conductive portion 314 and the second conductive portion 324 substantially block or absorb light from the display module 200. However, since the first conductive portion 314 and the second conductive portion 324 are disposed at two same sides of the touch-sensing module 300, in one hand, two sides of the first touch-sensing sheet 310 respectively connected to the first side 312 and the second side 313, and in the other hand, two sides of the second touch-sensing sheet 320 respectively connected to the third side 322 and the fourth side 323 are not covered by the upper casing 400. It can be seen that the area of the display module 200 covered by the touch-sensing module 300 can be reduced by disposing the conductive portions 314, 324 at the same side of the touch-sensing module 300. Consequently, the available display area of the display module 200 is increased to achieve the borderless appearance of the touch-sensing display device 100, especially on the two borderless sides not disposed with the first and second conductive portions 314, 324.

As FIG. 2 shows, the second touch-sensing sheet 320 further includes a plurality of sensing conductive strips 325 disposed on the substrate 321, wherein the sensing conductive strips 325 are located between the second conductive portions 324 and electrically connected to the second conductive portions 324. As FIG. 2 shows, the sensing conductive strips 325 are perpendicular to the second conductive portions 324, wherein one end of each sensing conductive strip 325 is electrically connected to one of the second conductive portions 324 while the other end straightly extends toward the other second conductive portion 324. In other words, the sensing conductive strip 325 is a conductor extending in a straight line across the substrate 321, e.g., from the third side 322 to the fourth side 323, but is not limited thereto; in different embodiments, the sensing conductive strip 325 can be disposed tortuously to form a meander on the substrate 321 (illustrated in FIG. 6) or in other shapes. Furthermore, the material of the sensing conductive strip 325 of the present embodiment includes conductive and light-transmissible indium tin oxide (ITO), but is not limited thereto; in different embodiments, the sensing conductive strip 325 can include conductive and light-transmissible material such as indium zinc oxide (IZO) or aluminum-doped zinc oxide (AZO). Furthermore, the second sensing sheet 320 illustrated in FIG. 2 further includes a plurality of spacers 326, wherein each of the spacers 326 is disposed on the substrate 321 and between adjacent sensing conductive strips 325 to maintain the distance between the adjacent sensing conductive strips 325.

In the embodiment illustrated in FIG. 2, one of the first conductive portions 314 is electrically connected to the backend processor 500, wherein the backend processor 500 of the present embodiment can have a software-assisted function and be disposed on a printed circuit board or in a personal computer. Alternatively, the backend processor 500 can be connected to a flexible circuit board as shown in FIG. 2 and then to other device such as personal computer for further processing (not shown). Furthermore, a fixed voltage can be applied to the two first conductive portions 314, wherein one of the first conductive portions 314 is grounded. Similarly, a fixed voltage is applied to the two second conductive portions 324, wherein one of the second conductive portions 324 is grounded. In the present embodiment, the fixed voltage is set at 5 V, but is not limited thereto; in different embodiment, the voltage can be adjusted according to different design choices. As FIG. 2 shows, the second sensing sheet 320 of the present embodiment includes a plurality of resistance portions 327, wherein the resistance portions 327 have substantially different resistance. In the present embodiment, the resistance of the resistance portion 327 is modified by changing its structure. For instance, the resistance of resistance portion 327 can be modified by preferably changing its length, width, or thickness, seldom by changing the material of the resistance portion 327. Two ends of the resistance portion 327 are connected to the second conductive portion 324 and the sensing conductive strip 325, respectively. In other words, in this embodiment, since each resistance portion 327 has substantially different resistance and is electrically connected to one of the sensing conductive strips 325 in series, the combination of each resistance portion 327 and the corresponding sensing conducive strip 325 has substantially different resistance. In this way, each sensing conductive strip 325 is different in voltage. In the present embodiment, different voltage can be applied to different sensing conductive strip 325, but it is not limited thereto; in different embodiments, each sensing conductive strip 325 can be connected to a flexible circuit board through a pin, wherein different signals are fed to the sensing conductive strips 325 through the respective pins. Furthermore, in the embodiment illustrated in FIG. 2, the resistance portion 327 is disposed on one side of the sensing conductive strip 325 which is near the third side 322, but is not limited thereto; in different embodiments, the resistance portion 327 can be disposed on the other side of the sensing conductive strip 325 which is near the fourth 323.

Figure 3A:
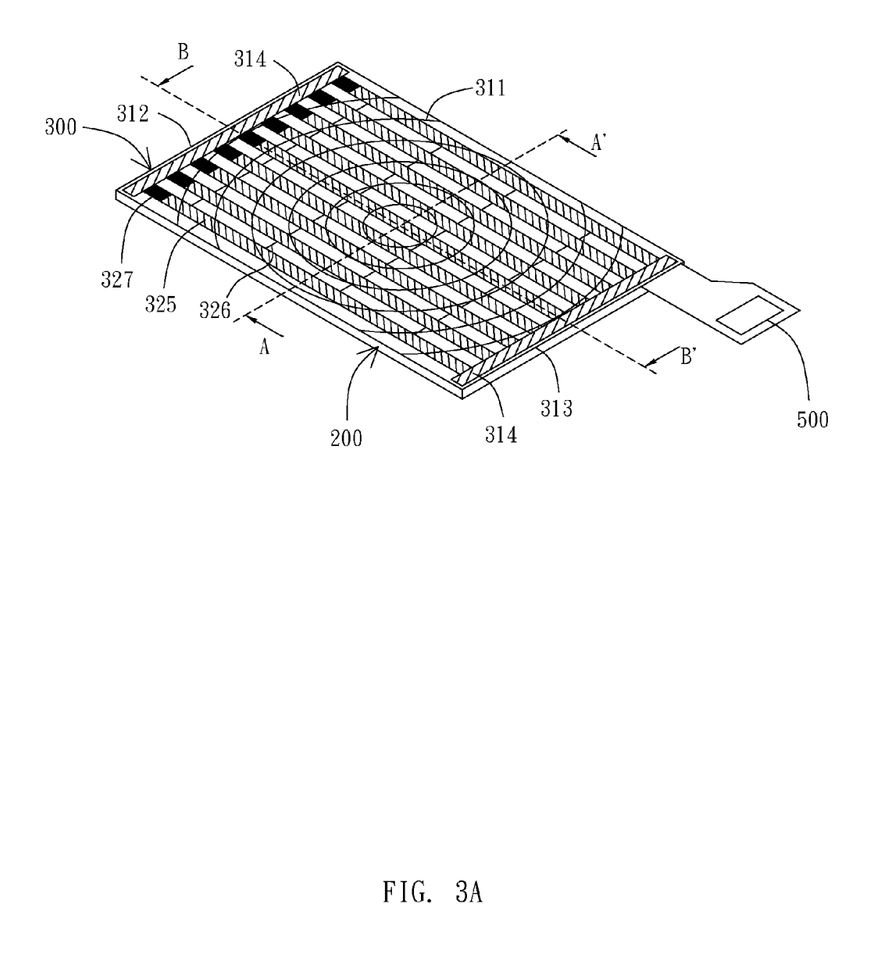
FIG. 3A is a schematic view of the first conductive portion, the second conductive portion and the display module attached together.
Figure 3B:
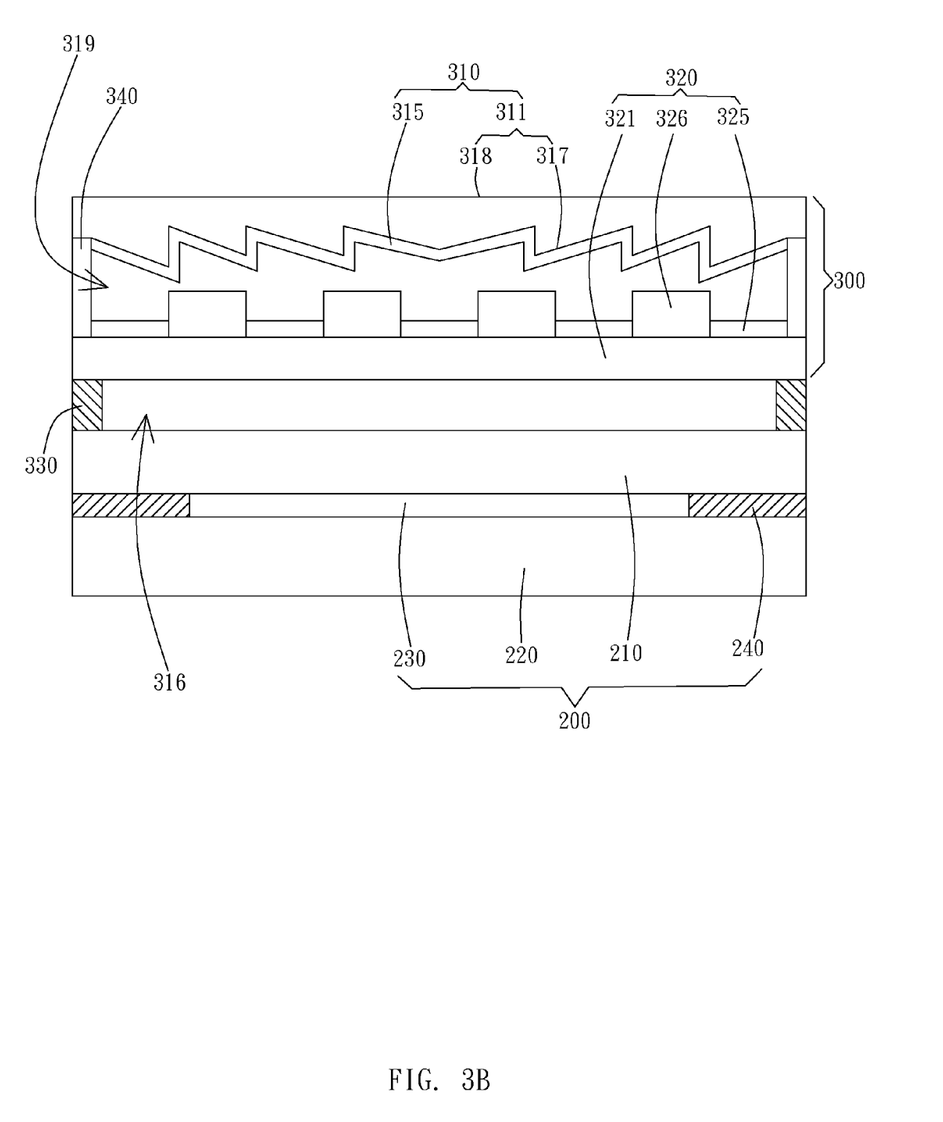
FIG. 3B and FIG. 3C are cross-sectional views of the touch-sensing display device illustrated in FIG. 3A.

FIG. 3A is a schematic view of the first conductive portion 314, the second conductive portion 324 and the display module 200 attached together. FIG. 3B is a cross-sectional view of the display module 200 and the touch-sensing module 300 illustrated in FIG. 3A along the line A-A', wherein the touch-sensing portion 300 is disposed on the display module 200. As FIG. 3B shows, the touch-sensing display device 100 includes the display module 200, the touch-sensing module 300 and a first fixing element 330, wherein the touch-sensing module 300 is disposed on the display module 200, and a first space 316 exists between the touch-sensing module 300 and the display module 200. The first space 316 of the present embodiment is a space of air layer or vacuum. In other words, the first space 316 is a transparent layer for refracting the image signal of the display module 200 in a unidirectional fashion. Furthermore, the refractive index in the first space 316 is preferably 1.0, but is not limited thereto; in different embodiments, the refractive index in the first space 316 can be adjusted between 0.5 and 1.5. The first fixing element 330 of the present embodiment is an adhesive for fixing the touch-sensing module 300 onto the display module 200, but is not limited thereto. In different embodiments, the first fixing element 330 includes objects that can shield light such as clip, metal frame, plastic frame or other elements capable of fixing two flat objects together. The thickness of the first space 316 is 3 mm, but is not limited thereto; in different embodiments, the thickness of first space 316 can be adjusted between 1 mm and 5 mm according to limitations on the overall thickness of touch-sensing display device 100 or other design choices. The display module 200 of the present embodiment is a liquid crystal display panel including an upper substrate 210, a lower substrate 220, a liquid crystal layer 230 and a sealant 240, wherein the liquid crystal layer 230 is maintained between the upper substrate 210 and the lower substrate 220 by the sealant 240. Since the lens layer 311 can magnify the images generated by the display module 200, the sealant 240 is concealed from the user, and therefore the touch-sensing display device 100 will achieve a visual effect of borderless appearance on two opposite sides. The display module 200 of the present embodiment further includes a backlight module (not shown) used as a light source for the display module 200.

Figure 3C:
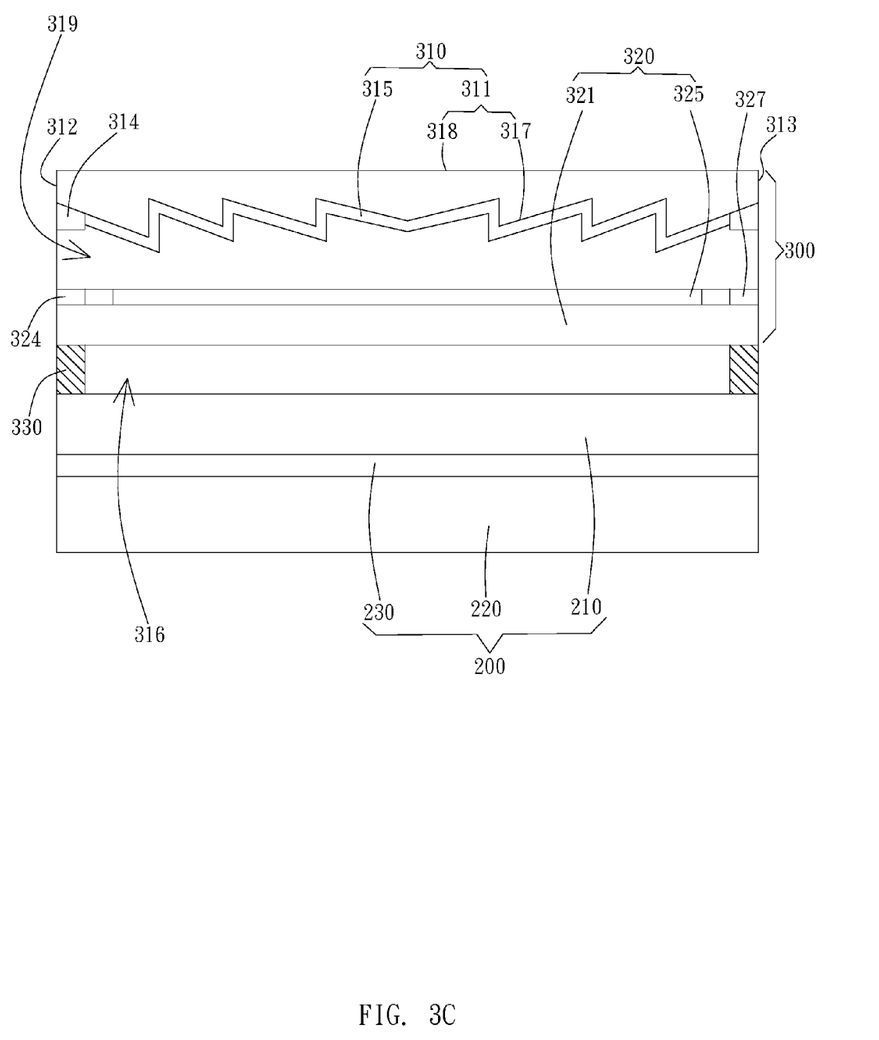

In the embodiment illustrated in FIG. 3B, the lens layer 311 of the present embodiment includes an annular Fresnel lens structure, wherein the lens layer 311 is capable of condensing light from the display module 200 and magnifying the image of the display module 200, but is not limited thereto; in different embodiments, the lens layer 311 can include a linear Fresnel lens structure or other lens structure capable of condensing light or magnifying image. Furthermore, as FIG. 3B shows, the lens layer 311 includes a light entrance surface 317 and a light exit surface 318, wherein the light entrance surface 317 faces the second sensing sheet 320 and the display module 200 to receive light or image from the display module 200. In the present embodiment, the light entrance surface 317 has a concave and convex structure while the light exit surface 318 is a planar surface, but is not limited thereto; in different embodiments, the light entrance surface 317 and the light exit surface 318 can have other suitable surface structures. Furthermore, in another cross-sectional view of the embodiment illustrated in FIG. 3C along line B-B', the first sensing sheet 310 further includes a conductive film 315 disposed on the light entrance surface 317 of the lens layer 311, wherein the conductive film 315 is electrically connected to both first conductive portions 314, and the lens layer 311 includes the first side 312 and the second side 313 opposite to the first side 312.

In the embodiment illustrated in FIG. 3B, the sensing conductive strips 325 and the spacers 326 of the second sensing sheet 320 are disposed on the substrate 321, wherein a second space 319 and a second fixing element 340 are located between the first sensing sheet 310 and the second sensing sheet 320. The second fixing element 340 is disposed at the edge of the substrate 321 and the lens layer 311 and its thickness creates the second space 319 between the first sensing sheet 310 and the second sensing sheet 320. The second fixing element 340 of the present embodiment is an adhesive for fixing the lens layer 311 and the conductive layer film 315 onto the substrate 321, but is not limited thereto; in different embodiments, the second fixing element 340 includes clip, anisotropic conductive film tape, adhesive mixed with conductive golden spheres, or other elements for fixing two planar objects. Furthermore, in order to prevent the conductive film 315 from unexpectedly making contact with the sensing conductive strips 325 and causing sensing error, the spacers 326 are disposed between adjacent conductive strips 325. In the present embodiment, the spacer 326 is disposed between the first sensing sheet 310 and the second sensing sheet 320 to form the second space 319 between two sensing sheets 310, 320. As FIG. 3B shows, the thickness of the spacer 326 is greater than the thickness of the sensing conductive strips 325 so that the spacer 326 can maintain the distance between the conductive film 315 and the sensing conductive strips 325 to avoid sensing error as described above. In the embodiment illustrated in FIG. 3B, the second space 319 is a space of air layer for accepting and refracting light signals of images farm from the display module 200, but is not limited thereto. In different embodiments, the second space 319 can be a space of vacuum. Furthermore, the refractive index in the second space 319 is preferably 1.0, but is not limited thereto; in different embodiments, the refractive index in the second space 319 can be adjusted between 0.5 and 1.5.

Figure 4:
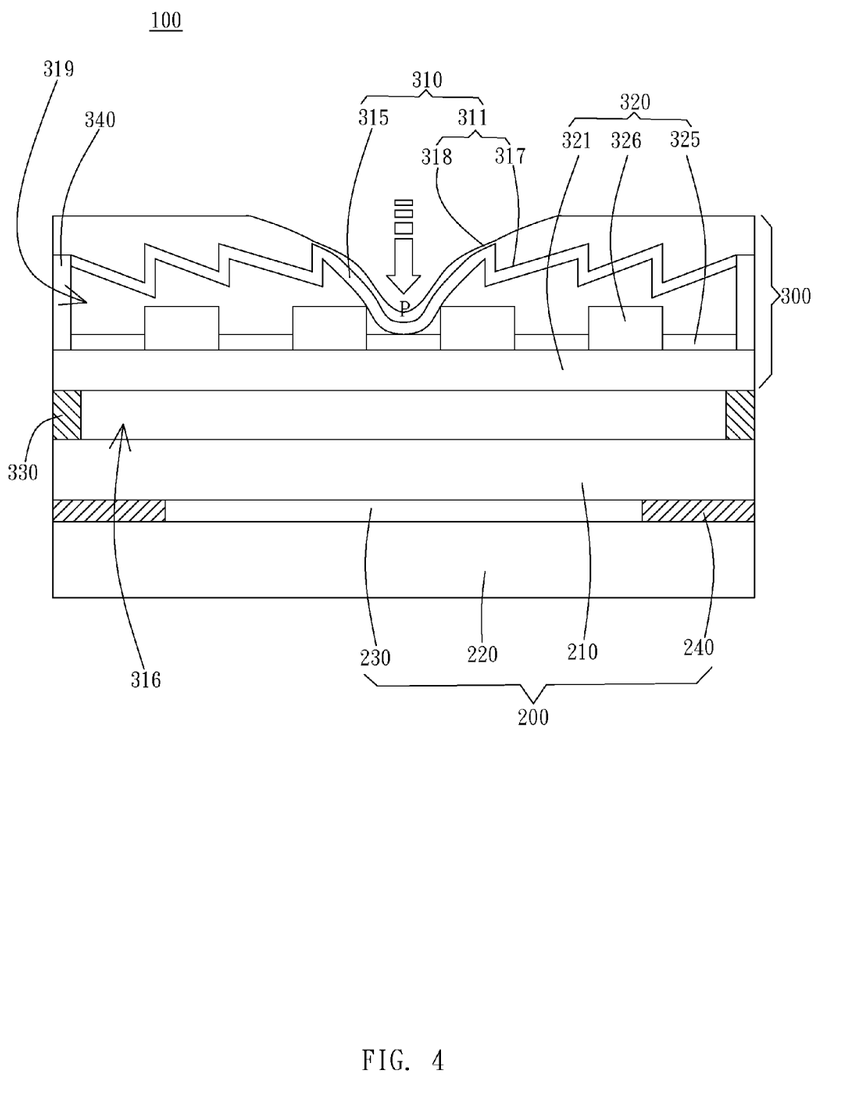
FIG. 4 is another cross-sectional view of the touch-sensing display device illustrated in FIG. 2.

Referring to FIG. 4, the working principle of the touch-sensing module 300 of the present invention will be explained. FIG. 4 is a cross-sectional view of the touch-sensing display device 100. As FIG. 4 shows, when an object (finger or stylus) exerts force on the lens layer 311 to press the conductive film 315 downward making contact (short-circuiting) with the sensing conductive strip 325, the conductive film 315 on the inner surface of the lens layer 311 electrically connects at least one of the sensing conductive strips 325. As FIG. 4 and FIG. 3A shows, the conductive film 315 and the sensing conductive strips 325 makes contact at touch point P. In the present embodiment, when the conductive film 315 contacts the sensing conductive strip 325, the electrical signal on the sensing conductive strip 325 will be transmitted through the conductive film 315 to the first conductive portion 314 and then to the backend processor 500. Similarly, the electrical signal of the conductive film 315 at the touch point P will be transmitted through the sensing conductive strip 325 to the second conductive portion 324 and then to the backend processor. The backend processor 500 then calculates the coordinates of the touch point P after receiving electrical signals form the conductive film 315 and the sensing conductive strips 325. In other words, the first sensing sheet 310 and the second sensing sheet 320 are used to detect the electrical signals of the conductive film 315 and the sensing conductive strip 325 at the touch point P, so that the backend processor 500 can calculate the coordinates of the touch point P based on the electrical signals.

Figure 5:
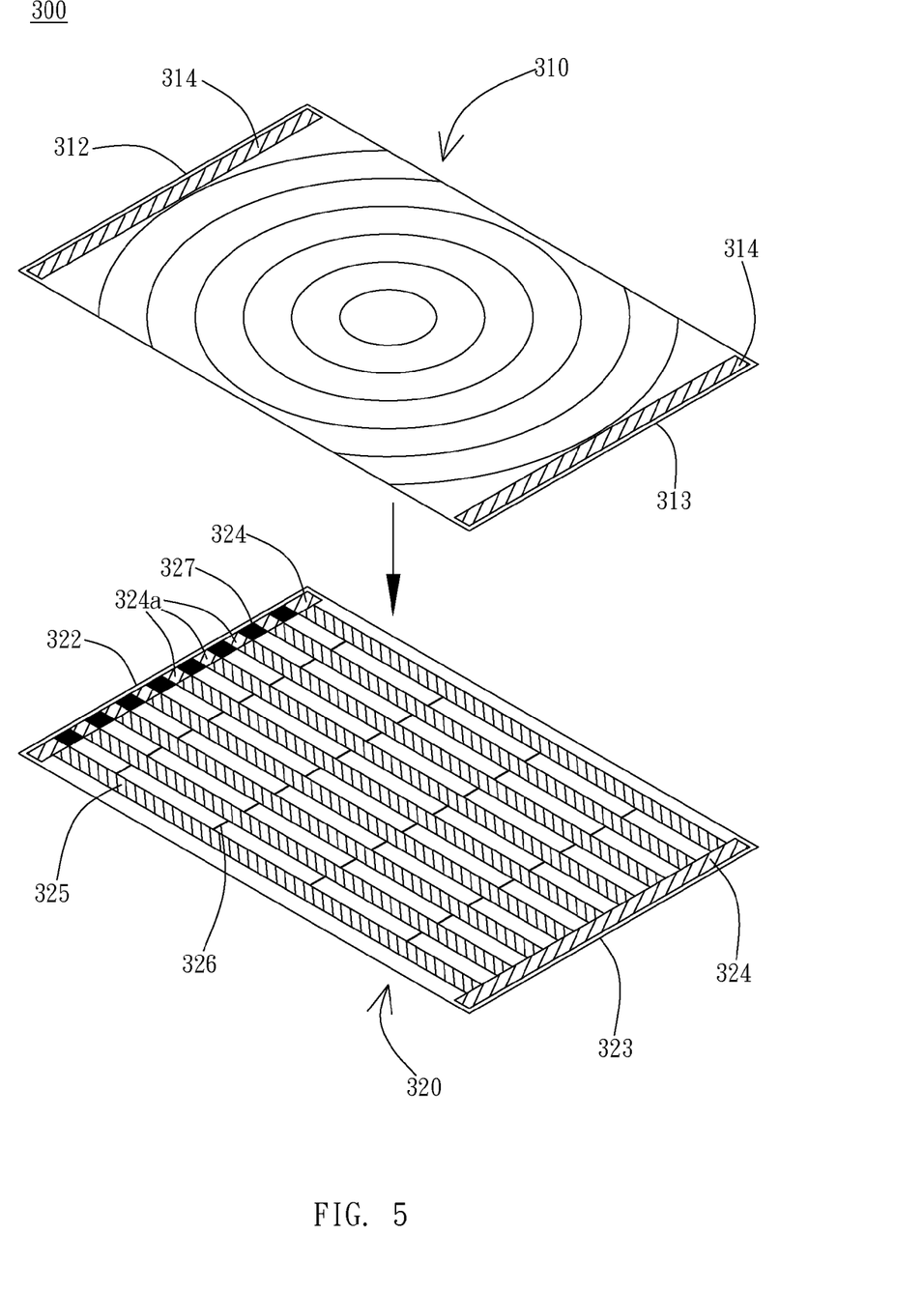
FIG. 5 and FIG. 6 illustrate variation embodiments of the touch-sensing display device illustrated in FIG. 2.

FIG. 5 is a schematic view of a variation embodiment of the touch-sensing module 300 illustrated in FIG. 2, wherein only the first sensing sheet 310 and the second sensing sheet 320 are illustrated in FIG. 5 for clarity. As FIG. 5 shows, at least one of the second conductive portions 324 of the present embodiment includes a plurality of sub-electrodes 324a, wherein a plurality of resistance portions 327 are connected in series with the sub-electrodes 324a. In the present embodiment, the resistance portion 327 is used to adjust the voltage at each sensing conductive strip 325. Therefore, when the conductive film 315 of the first sensing sheet 320 contacts different sensing conductive strips 325, the electrical signal received by the first conductive portion 314 and the conductive film 315 will be different. Furthermore, in the present embodiment, each resistance portion 327 has substantially the same resistance, but is not limited thereto; in different embodiments, the resistance portions 327 can have different resistance in order to adjust the voltage of the sensing conductive strips 325.

Figure 6:
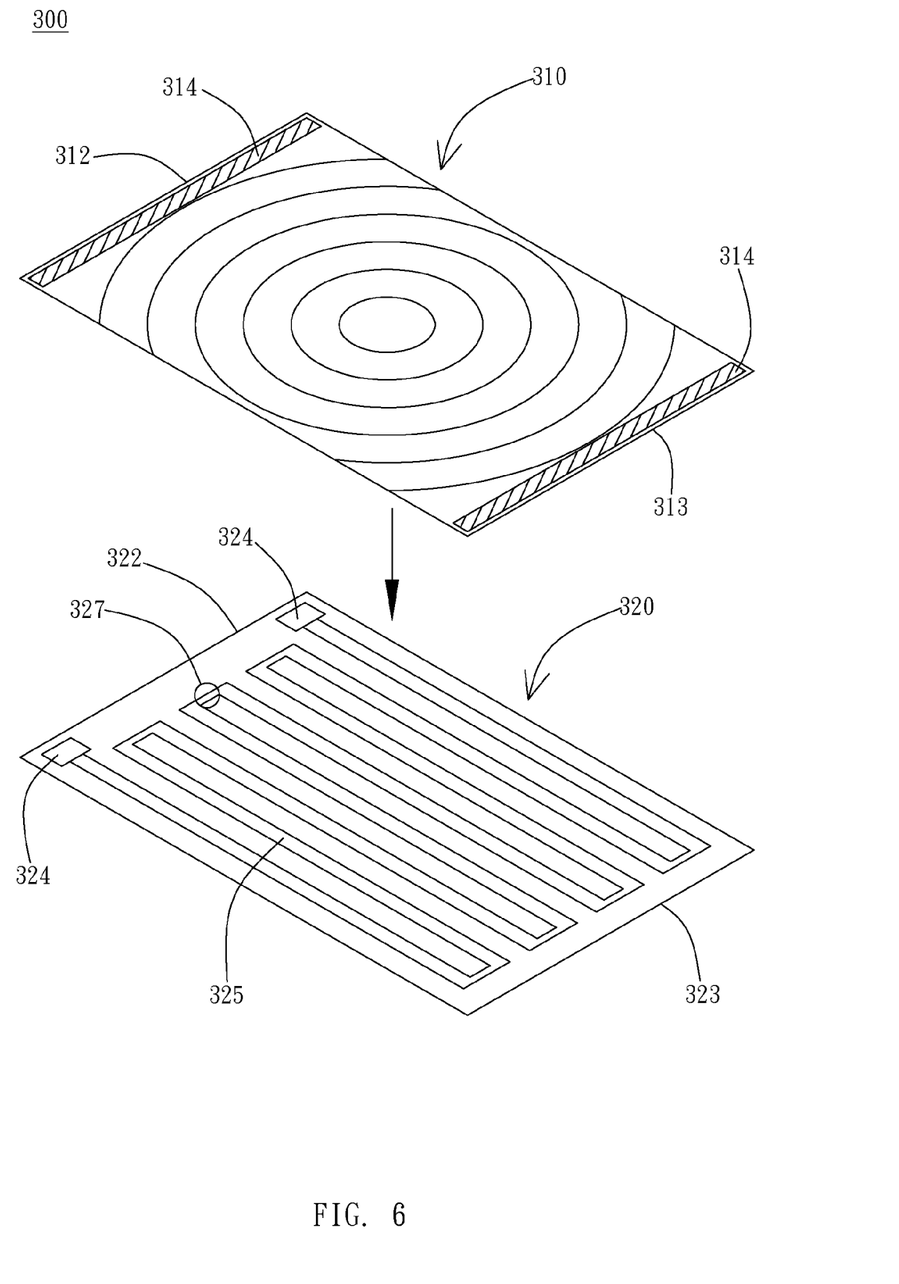

FIG. 6 illustrates another variation embodiment of the touch-sensing module 300 illustrated in FIG. 2, wherein only the first sensing sheet 310 and the second sensing sheet 320 are illustrated in FIG. 6 for clarity. As FIG. 6 shows, two second conductive portions 324 are disposed on two ends of the third side 322 of the substrate 321. One end of the sensing conductive strip 325 is electrically connected to the closest end of adjacent sensing conductive strip 325 on one side while the other end is electrically connected the closest end of another adjacent sensing conductive strip 325 on the other side. That is, the adjacent sensing conductive strips 325 are spaced apart form each other by a distance. In the present embodiment, two ends of each resistance portion 327 are connected to the closest ends of two adjacent sensing conductive strips 325. Furthermore, one end of the sensing conductive strip 325 adjacent to the second conductive portion 324 is electrically connected to the second conductive portion 324. In other words, the sensing conductive strips 325 and the resistance portions 327 are electrically connected in series to form a tortuous conductive strip.

In the embodiment illustrated in FIG. 6, a voltage of 5 V is applied to the second conductive portion 324, but is not limited thereto; in different embodiments, the applied voltage can be optionally modified. In the present embodiment, each sensing conductive strip 325 substantially has the same resistance. Since two ends of each sensing conductive strip 325 is electrically to one resistance portion 327, each sensing conductive strip 325 corresponds to different voltage. Furthermore, when the conductive film 315 contacts different sensing conductive strips 325, the first conductive portion 314 will sense different voltages. Furthermore, in the present embodiment, the resistance portion 327 is a conventional passive resistor located between the sensing conductive strips 325, wherein the resistance portions 327 have the same resistance, but are not limited thereto. In the present embodiment, the resistance portion 327 and the sensing conductive strip 325 are made of the same material, but are not limited thereto. Furthermore, the resistance of a conductor is inversely proportional to its cross-sectional area, and therefore the thickness or width of the resistance portion 327 of the touch-sensing module 300 can be modified to adjust the voltage at the sensing conductive strips 325.

The above is a detailed description of the particular embodiment of the invention which is not intended to limit the invention to the embodiment described. It is recognized that modifications within the scope of the invention will occur to a person skilled in the art. Such modifications and equivalents of the invention are intended for inclusion within the scope of this invention.

What is claimed is:

1. A touch-sensing display device, comprising:
a display module; and
a touch-sensing module disposed on the display module, wherein a first space exists between the display module and the touch-sensing module, the touch-sensing module includes:
a first sensing sheet, including:
a lens layer comprising a light entrance surface and a light exit surface, wherein the lens layer further comprises a first side and a second side opposite to each other;
a plurality of first conductive portions disposed on the light entrance surface of the lens layer; and
a conductive film disposed on the light entrance surface of the lens layer and between the first conductive portions and electrically connected to the first conductive portions; and
a second sensing sheet, wherein a second space exists between the first sensing sheet and the second sensing sheet, the second sensing sheet includes:
a substrate facing the lens layer and including a third side and a fourth side corresponding to the first side and the second side, respectively;
a plurality of second conductive portions; and
a plurality of sensing conductive strips electrically connected to the second conductive portions.

2. The touch-sensing display device of claim 1, wherein the touch-sensing module further includes a spacer disposed between the first sensing sheet and the second sensing sheet to maintain the second space between the first sensing sheet and the second sensing sheet.

3. The touch-sensing display device of claim 2, wherein the spacer is disposed between adjacent sensing conductive strips.

4. The touch-sensing display device of claim 1, wherein two ends of each sensing conductive strip are connected between the second conductive portions, the sensing conductive strips are perpendicular to the second conductive portions.

5. The touch-sensing display device of claim 4, wherein the second sensing sheet further includes a plurality of resistance portions electrically connected to the second conductive portion or the sensing conductive strip.

6. The touch-sensing display device of claim 5, wherein two ends of each resistance portion are electrically connected respectively to one end of the sensing conductive strip and the second conductive portion.

7. The touch-sensing display device of claim 5, wherein two ends of the resistance portion are connected to two adjacent sensing conducive strips.

8. The touch-sensing display device of claim 4, wherein the second conductive portions are parallel to each other and extend parallel to the third side or the fourth side.

9. The touch-sensing display device of claim 1, wherein one end of the sensing conductive strip is electrically connected to one end of the nearest sensing conductive strip on one side while another end of the sensing conductive strip is electrically connected to one end of another nearest sensing conductive strip on another side, the sensing conductive strips are electrically connected and tortuously disposed to form a meander on the substrate.

10. The touch-sensing display device of claim 9, wherein the second conductive portions are disposed on the third side.

11. The touch-sensing display device of claim 9, wherein the adjacent sensing conductive strips are connected by a resistance portion.

12. The touch-sensing display device of claim 1, wherein the touch-sensing module further includes a fixing element, disposed between the first sensing sheet and the second sensing sheet, for connecting the first sensing sheet with the second sensing sheet.

13. A touch-sensing module, comprising:
a lens layer having a first side and a second side opposite to each other;
a plurality of first conductive portions including a first electrode and a second electrode disposed on the lens layer and adjacent to the first side and the second side of the lens layer;
a transparent conductive film disposed on the lens layer while electrically connected to the first electrode and the second electrode;
a substrate corresponding to the lens layer and having a third side and a fourth side opposite to each other, the third side and the fourth side corresponding to the first side and the second side, respectively;
a plurality of second conductive portions distributed on at least one of the third side and the fourth side;
a plurality of transparent conductive strips disposed on the substrate and extend in a direction perpendicular to the third side and the fourth side; and a transparent refractive layer disposed between the lens layer and the substrate.

14. The touch-sensing module of claim 13, further comprising a plurality of spacers disposed on the substrate and located between adjacent transparent conductive strips.

15. The touch-sensing module of claim 13, wherein the second conductive portions include a third electrode and a fourth electrode disposed respectively at the third side and the fourth side of the substrate adjacent to the lens layer, respectively.

16. The touch-sensing module of claim 15, wherein one end of the transparent conductive strip is electrically connected to the third electrode while another end of the transparent conductive strip is electrically connected to the fourth electrode.

17. The touch-sensing module of claim 16, further comprising a plurality of resistance portions disposed on the substrate.

18. The touch-sensing module of claim 17, wherein the transparent conductive strip is connected to the third electrode via the resistance portion.

19. The touch-sensing module of claim 17, wherein the third electrode includes a plurality of sub-electrode respectively electrically connected to the transparent conductive strips, the sub-electrodes are electrically connected via the resistance portions.

20. The touch-sensing module of claim 13, wherein the second conductive portions include a fifth electrode and a sixth electrode disposed at the third side of the substrate adjacent to the lens layer.

21. The touch-sensing module of claim 20, wherein one end of one of the transparent conductive strips is electrically connected to the fifth electrode or the sixth electrode.

22. The touch-sensing module of claim 20, wherein one end of one of the transparent conductive strip is electrically connected to one end of one of adjacent transparent conductive strips and spaced apart form one end of one of adjacent transparent conductive strips by a distance.

23. The touch-sensing module of claim 22, further comprising a resistance portion disposed on the substrate and between two adjacent transparent conductive strips.

* * * * *